United States Patent [19]

Schneller et al.

[11] 3,967,016

[45] June 29, 1976

[54] REINFORCED WALLBOARD

[75] Inventors: Joseph W. Schneller, Williamsville;
Duane C. Bennett, Eggertsville;
George P. Matiacio, Cheektowaga,
all of N.Y.

[73] Assignee: National Gypsum Company,
Buffalo, N.Y.

[22] Filed: Aug. 28, 1974

[21] Appl. No.: 501,332

[52] U.S. Cl. .............................. 427/393; 427/439;
428/424; 428/425; 428/537
[51] Int. Cl.² ...................... B05D 3/02; B05D 1/18;
B32B 27/40
[58] Field of Search .................. 117/155 R, 161 KP;
161/182; 427/393, 439; 428/424, 425, 537

[56] References Cited
UNITED STATES PATENTS

| | | | |
|---|---|---|---|
| 3,102,835 | 9/1963 | White | 117/62.2 X |
| 3,389,008 | 6/1968 | Bailey | 117/155 X |
| 3,428,609 | 2/1969 | Chilvers et al. | 117/155 X |
| 3,702,781 | 11/1972 | Dahl | 117/155 X |
| 3,726,838 | 4/1973 | Eimer et al. | 117/155 X |
| 3,824,147 | 7/1974 | Baird | 117/155 X |

*Primary Examiner*—Michael R. Lusignan
*Attorney, Agent, or Firm*—Robert F. Hause

[57] ABSTRACT

Paper-covered gypsum wallboard of increased racking resistance which has been strengthened by impregnation completely through the thickness of the cover paper, at least throughout certain critical areas, by coating and subsequent absorption thereinto of water-free polymeric solutions. A most significant improvement results from impregnation thereinto of a moisture-curing isocyanate resin, preferably a semiprepolymer of a polyisocyanate and a polyol in combination with a viscosity reducing solvent, such as mineral spirits or xylene, and a catalyst. Improved mobile home walls are formed with the impregnated areas of gypsum board back face paper disposed over and adhered to framing members with glue or the like.

8 Claims, 11 Drawing Figures

REINFORCED WALLBOARD

This invention relates to a strengthened gypsum wallboard, the method of making the strengthened wallboard and to structures incorporating such board.

While gypsum wallboard is by far the most common surface material used for interior surfaces of non-mobile homes, wood fiber boards, such as plywood, have been by far the most common surface material used on mobile home interior surfaces. Gypsum wallboard is capable of providing a more fire-resistant mobile home; however, efforts toward producing a competitive mobile home with gypsum board have encountered the problem of an inadequate racking strength of walls constructed with gypsum board, resulting in cracking of the walls, loosening of wall panels and permanent deformation of the home during transporting.

The primary strength-providing elements of a gypsum board are the two spaced apart parallel paper cover sheets. These paper cover sheets have a tensile strength such that, when combined with the gypsum core, a strong board is formed resistant to the common stresses encountered in non-mobile home construction.

A stress which is far more prevalent in mobile homes is a shear stress in a plane parallel to the board, and this stress is best demonstrated by what is referred to as a racking test. In a racking test, the bottom edge of a wall is held stationary while the top edge is moved in the direction of the extent of the top edge. If a wall consisted solely of a base runner, a ceiling runner, and a plurality of vertical studs, there would then be very little resistance to racking, or, in other words, almost no racking strength. When plywood or gypsum board is affixed to the runners and studs, the racking strength is increased.

This test is performed according to ASTM E72 or FHA Technical Circular No. 12, except that the frame is 8 feet (3.34 meters) long, 7½ feet (3.14 meters) tall, with studs 16 inches (40½ cm) on center, with a single top plate, single end studs and single sole plate. Facing sheets of plywood or gypsum board are applied to one face of the frame, using a continuous coating of polyvinyl acetate adhesive, in combination with staples located every 6 inches (15.2 cm) along each framing member. After the adhesive is set, load is applied to the end of the double top plate in 400 pound (181 kg) increments. At 1,200 pounds (543 kg), the deflection can be no more than 0.2 inch (0.5 cm). The load is removed and the residual deflection can be no more than 0.1 inch (0.25 cm). The load is then increased, in 400 pound (181 kg) increments, from 1200 pounds (543 kg) to 2400 pounds (1086 kg). The total deflection can be no more than 0.6 inch (1.5 cm). The load is removed and the residual deflection can be no more than 0.3 inch (.75 cm). The load is then increased in 400 pound (181 kg) increments from 2,400 pounds (1086 kg) to failure, which is the maximum load detected prior to continued deflection at loads less than this maximum load. The load at failure is recorded.

It will be readily understood that the degree of resistance to racking which the facing boards contribute, in the racking test, will be dependent on the stiffness of the board and the internal shear resistance of the boards, in a plane parallel to the face of the boards. The stiffness of the gypsum board is provided by the gypsum core. High shear resistance in the cover paper is needed to transfer this stiffness to the adhesive and the framing members.

The cover paper of prior gypsum boards has not had a shear resistance sufficient for a gypsum board faced wall to equal a plywood faced wall in racking strength, the typical prior ¼ inch (0.63 cm) gypsum board faced wall failing at about 2,500 to 3,500 pounds (1130 to 1580 kg), while the 5/32 inch (0.4 cm) plywood faced wall did not fail until about 5,000 pounds (2260 kg) of load was applied.

It is an object of the present invention to provide improved paper-covered gypsum wallboard.

It is a further object to provide a method of improving the racking strength of gypsum board by reinforcing the back face paper in at least certain critical areas, with ¼ inch (0.63 cm) to 5/16 inch (.77 cm) board.

It is a still further object to provide a mobile home wall of gypsum board which is adequate for resisting the unusual stresses occurring during travel.

EXAMPLE I

A preferred embodiment of the invention, which had proven to have a very significant importance, is the impregnation of portions of the porous paper cover sheet on the back face of a paper-covered gypsum wallboard.

A semi-prepolymer is prepared by the mixing and reacting of the following ingredients:

|  | Parts by weight |
| --- | --- |
| Polyisocyanate | 80 |
| Polypropylene glycol diol | 20 |
| Xylene | 42.5 |
| Dibutyl tin laurate | 0.07 |

This semi-prepolymer was then applied as a coating onto the surface of certain areas of the back paper of a gypsum wallboard at a rate of 20 grams per square foot of coated area. The gypsum wallboard was a ¼ inch (.63 cm) thick, 4 ft. (1.67 meters) by 8 ft. (3.34 meters) board with a gypsum core and a front and back paper adhered thereto. The front and back papers are each about 0.020 inch (0.05 cm) thick, leaving a gypsum core of about 0.210 inch (0.53 cm) thickness.

The coated areas were all three inch (7.6 cm) wide strips and included a strip along each end, and a strip along each side.

These strips of wallboard back face paper, as soon as they were coated, immediately absorbed the semi-prepolymer coating, so that the paper fibers were coated with the semi-prepolymer throughout the full thickness of the paper. This complete and uniform absorption has been obtained when the coating was brushed on and when rolled on.

The polyisocyanate used was an aromatic polyisocyanate, having a functionality of 2.7, and is sold by Mobay Chemical Company under the trademark Mondur MRS.

The polypropylene glycol diol was a urethane polyol having a molecular weight of 2000, and is manufactured by Jefferson Chemical Company and sold under the trademark Thanol PPG 2000.

The xylene is a common solvent, dimethyl benzene, and gives the semi-prepolymer the characteristics necessary for immediate and uniform impregnation into the porous material. After impregnation, the xylene evaporates off.

The dibutyl tin laurate or other organo tin compounds are common catalysts for reacting isocyanates with polyols, water, ureas, etc.

As is well known in the urethane art, the amounts of isocyanate and polyol used in the above formulation form a prepolymer in which most of the isocyanate remains unreacted, potentially reactive with hydroxyl groups, such as with water or the moisture in the air. As is typical of paper, the paper on the gypsum wallboard contains some water in it which is free to react with the semi-prepolymer impregnated thereinto. The moisture in the air is also allowed to react with this impregnant. As a result, the semi-prepolymer becomes rapidly reacted, or cured, to a strong non-tacky relatively hardened resin reinforcement uniformly disposed within and throughout the paper in the areas where the paper has been coated and impregnated.

This reaction progresses at a rate such that the finished board can be used, or arranged in stacks, for storage or shipment, within a very few minutes after the paper is first coated, without any detrimental effects.

EXAMPLE II

Portions of the porous paper cover sheet on the back face of a paper-covered gypsum wallboard which were to be subsequently disposed adjacent a framing member were coated and impregnated with polyisocyanate. The polyisocyanate used was Mobay Chemical Company's Mondur MRS. The polyisocyanate was applied in three coats leaving enough time between each coat for the material to be absorbed into the paper. Each coat consisted of about ten grams per square foot (0.093 square meter) applied in three inch (7.6 cm) wide strips, and about one minute was allowed for absorption between each coat. Since the polyisocyanate was not prereacted with any polyol and no catalyst was added, the reaction with the moisture in the paper and in the air takes considerably longer than the reaction of Example I. The impregnated wallboard of Example II was left exposed to the atmosphere for about ten days.

EXAMPLES III – V

Other semi-prepolymer formulations that were prepared and applied to portions of the back face of gypsum wallboard are as follows:

|  | Parts by weight | | |
|---|---|---|---|
|  | III | IV | V |
| Polyisocyanate | 80 | 75 | 75 |
| Polyether polyol based on polypropylene glycol | 20 | 25 |  |
| Glycerine based polyether triol |  |  | 25 |
| Xylene | 30 | 30 | 25 |
| Dibutyl tin laurate | 0.05 | 0.05 | 0.05 |

Where in the formulations of the Examples a polyurethane is stated, suitable materials which could be employed would include any organic isocyanates, such as toluene diisocyanate (TDI), diphenyl methane 4, 4' diisocyanate (MDI), polymethylene polyphenyl isocyanate (PAPI) and the like.

The polyether polyol based on polypropylene glycol is a polyol having a molecular weight of 2000, and may be one manufactured by Union Carbide and sold under the trademark PPG 2025, or one manufactured by Jefferson Chemical and sold under the trademark PPG 2000.

The glycerine based polyether triol is a polyol having a molecular weight of 3000, manufactured by Dow Chemical Company and sold under the trademark Dow CP 3000.

The only significant differences that have been noted in the performance of the various coatings of Examples I-V are differences in (1) the ability of the coatings to be easily applied and to be absorbed completely into and through the full thickness of the porous sheet, and in (2) the time for completion of the reaction of the polyisocyanate with the moisture in the porous sheet and from the atmosphere. All perform in substantially the same way as the others once they are disposed throughout the thickness of the porous sheet and cured.

EXAMPLES VI and VII

To a limited extent, mineral spirits may be used, rather than xylene, to provide the lower viscosity necessary for absorption into the porous sheet, as shown in the following formulations:

|  | Parts by Weight | |
|---|---|---|
|  | VI | VII |
| Polyisocyanate | 80 | 87.5 |
| Polypropylene glycol diol | 20 | 12.5 |
| Xylene | 9 | — |
| Mineral Spirits | 27 | 17.7 |
| Dibutyl Tin Laurate | 0.05 | 0.05 |

In Example VI, mineral spirits are combined with xylene to lower the viscosity of the coating. In Example VII, the xylene is omitted, and the mineral spirits are relied on to lower the viscosity of the coating. Mineral spirits are relatively less hazardous to work with as compared to xylene, however they can only be used to lower viscosity to a lesser extent than can xylene. The xylene acts as a solvent for the prepolymer and can be used in any proportion. The mineral spirits are dissolved by the prepolymer and can only be mixed and uniformly dissolved up to a limited extent.

In all of the above examples, the isocyanate-based coating composition is applied to the surface of a porous board, such as the surface of the paper on gypsum wallboard, by rolling, brushing, spraying or any other method which will give reasonably uniform distribution over the areas to which treatment is desired. The coating is applied at a rate sufficient for absorption of the coating material into and through the thickness of the porous material.

The coatings, other than the one of Example II, can be applied to the surface of the paper of a gypsum wallboard in one coat with sufficient quantity and low viscosity to result in complete penetration through the paper thickness, which is about 0.020 inch (0.05 cm) thick. These one coat coatings may be applied at a rate of about 4 to 20 grams per square foot (per 0.093 square meter) of wallboard paper surface, for uniform impregnation thereinto.

In the above-described racking test, gypsum board walls were tested having the back paper of the gypsum impregnated with coatings as disclosed in Examples I – VII. The coatings were applied in several ways, some over the entire back face, some over only those areas of the back face which are subsequently glued to the framing members, and some over only a strip across the top and bottom edge.

After the coatings are applied, and the coating material is absorbed into the porous paper, the product is dried, to remove the solvent, if used, and the remaining impregnated coating material is then cured.

In the Examples I and III to VII, after the solvent is removed, curing is carried out, preferably at room temperatures and humidity, such as 70°F and 30% relative humidity. Curing is sufficiently complete after as little as two hours for reaching substantially full strength, however it appears to continue to cure and increase in strength to some degree for up to about 2 days.

The coated-impregnated portions of a gypsum wallboard back paper is adhered directly to the face of framing members, such as wood 2 × 4s, using a thin coat of a polyvinyl alcohol or polyvinyl acetate liquid glue. The glue is roller applied to the entire face of the studs, and the top and bottom horizontal members, to which the wallboard is to be abutted. After the wallboards are disposed against the framing member faces with glue on them, the wallboards are stapled to the framing members to hold the boards in place while the glue hardens or sets. From one to three days will normally allow the glue to reach a substantially fully effective condition.

The above description of the manner of preparing wallboard and applying it to framing members to conduct racking tests is the same as the manner of preparing wallboard and applying it to framing members in the construction of a mobile home to be made in accordance with the invention.

In the racking tests made using ¼ inch (0.63 cm) gypsum wallboard, coated and impregnated as described above, racking strengths were obtained equalling and surpassing the common mobile home wall construction using 5/32 inch (0.4 cm) plywood.

EXAMPLE VIII

Another class of reactive polymer solution that adds considerable racking strength to wallboard is a solution of epoxy and hardener in xylene, such as in the following formulation:

|  | Parts by Weight |
|---|---|
| Epoxy (Ciba 6010) | 70 |
| Polyamide (Genamid 250) | 30 |
| Xylene | 50 |

This reactive solution was then applied as a coating onto the surface of the back paper of gypsum wallboard at a rate of 14.2 grams of solids per square foot (0.093 square meter), whereat it was absorbed into the paper. The epoxy and polyamide react and harden within the paper and the xylene evaporates.

EXAMPLE IX

Similarly, a phenolic and a hardener as follows may be used:

|  |  | Parts by Weight |
|---|---|---|
| Phenolic resin | (Durez 7421A) | 90 |
| Hardener | (Durez 7422) | 10 |
| Methanol |  | 50 |

This solution was applied as a coating on the back paper of gypsum wallboard at a rate of 18.8 grams of solids per square foot (0.093 square meter), whereat it was absorbed into the paper to react and dry.

EXAMPLE X

A film-forming, non-reactive impregnant, such as an acrylic, may be employed as follows:

|  | Parts by Weight |
|---|---|
| 50% Acrylic resin in toluene (Rohm and Haas B66) | 100 |
| Toluene | 100 |

The Rohm and Haas resin B66 is aviailable with acrylic resin being in toluene at a ratio of 1:1. Further dilution with additional toluene is necessary to provide a ratio of about 1:3. This formulation, when applied as a coating to wallboard back face paper, is readily absorbed throughout the thickness of the paper and the toluene is then evaporated off.

The above coating-impregnants are all solutions, free of water, which are absorbed into the paper, whereat they add considerable strength to the wallboard by their final dry or set form within the paper.

Having completed a detailed disclosure of the preferred embodiments of our invention so that those skilled in the art may practice the same, we contemplate that variations may be made without departing from the essence of the invention or the scope of the appended claims.

We claim:

1. The method of improving the strength of paper-covered gypsum wallboard comprising the steps of impregnating substantially the full thickness, which is about .020 inch, of at least portions of the area of a paper cover sheet on the back face of a gypsum wallboard with a substantially water-free resinous solution and allowing said impregnant to solidify therein.

2. The method of claim 1 wherein said resinous solution contains reactive isocyanate, comprising the further step of reacting said isocyanate with water while said isocyanate is disposed within the paper.

3. The method of claim 2 comprising the further step of prereacting isocyanate and a polyol to form a partially reacted water-free resinous solution containing reactive isocyanate, and impregnating said paper with said partially reacted prepolymer solution.

4. The method of claim 2 wherein said gypsum wallboard paper contains moisture and said reactive isocyanate reacts with said moisture contained in said paper.

5. The method of claim 3 wherein said resinous solution is applied at a rate sufficient to form about 4 to about 20 grams of solid impregnant per square foot (0.093 square meter) of impregnated surface area.

6. The method of claim 1 wherein said resinous solution includes an organic solvent, further comprising the step of drying off said solvent after completion of said impregnation.

7. The method of claim 1 wherein said resinous solution includes a reactive liquid resin and a liquid hardener for hardening said reactive liquid resin, further comprising the step of reacting the liquid ingredients of said impregnated solution causing the solidification thereof.

8. The method of claim 1 wherein said resinous solution consists of a film-forming resin and an organic solvent therefor.

* * * * *